US012778016B2

(12) United States Patent
de Camargo et al.

(10) Patent No.: US 12,778,016 B2
(45) Date of Patent: Nov. 3, 2026

(54) AGRICULTURAL HARVESTER AND RELATED AGRICULTURAL SYSTEM FOR ADJUSTING A FINNED ROLLER OF AN AGRICULTURAL HARVESTER

(71) Applicant: CNH Industrial Brasil Ltda., Nova Lima (BR)

(72) Inventors: Jean Carlos Pereira de Camargo, Piracicaba (BR); Marcos Ikeguchi Ohira, Piracicaba (BR); Danilo de Jesus dos Santos, Piracicaba (BR)

(73) Assignee: CNH Industrial Brasil Ltda., Nova Lima (BR)

( * ) Notice: Subject to any disclaimer, the term of this patent is extended or adjusted under 35 U.S.C. 154(b) by 259 days.

(21) Appl. No.: 18/393,204

(22) Filed: Dec. 21, 2023

(65) Prior Publication Data

US 2024/0206395 A1 Jun. 27, 2024

(30) Foreign Application Priority Data

Dec. 27, 2022 (BR) ...................... 10 2022 026687 5

(51) Int. Cl.
*A01D 57/22* (2006.01)
*A01D 45/10* (2006.01)
*A01D 57/01* (2006.01)
*A01D 67/00* (2006.01)

(52) U.S. Cl.
CPC ............. *A01D 57/22* (2013.01); *A01D 45/10* (2013.01); *A01D 57/01* (2013.01); *A01D 67/00* (2013.01)

(58) Field of Classification Search
CPC ........ A01D 45/10; A01D 57/01; A01D 57/22; A01D 67/00
See application file for complete search history.

(56) References Cited

U.S. PATENT DOCUMENTS

| | | | | |
|---|---|---|---|---|
| 4,924,662 | A * | 5/1990 | Quick | A01D 45/10 56/122 |
| 6,363,700 | B1 | 4/2002 | Fowler | |
| 8,230,669 | B2 | 7/2012 | Hinds | |
| 9,857,785 | B2 | 1/2018 | Richard | |
| 10,292,329 | B2 | 5/2019 | Almeida et al. | |
| 10,375,887 | B2 | 8/2019 | Almeida et al. | |
| 11,224,166 | B2 | 1/2022 | Almeida et al. | |
| 2011/0154793 | A1 * | 6/2011 | Ernst | A01D 43/082 56/94 |

(Continued)

FOREIGN PATENT DOCUMENTS

| | | | |
|---|---|---|---|
| BR | 102013006982 | A1 | 4/2016 |
| BR | 102013006982 | B2 | 5/2017 |
| CN | 105723931 | B | 1/2019 |

(Continued)

*Primary Examiner* — Christopher J Sebesta
*Assistant Examiner* — Julia C Tran
(74) *Attorney, Agent, or Firm* — Dority & Manning, P.A.

(57) ABSTRACT

An agricultural harvester has a chassis, a forward frame fixed to the chassis, and a lateral support bar movably coupled to the forward frame, with the lateral support bar being at least partially positioned within the forward frame. The agricultural harvester further includes a base cutter coupled to the lateral support bar, and a finned roller coupled to the lateral support bar such that movement of the lateral support bar moves the base cutter and the finned roller together.

20 Claims, 6 Drawing Sheets

(56) References Cited

U.S. PATENT DOCUMENTS

| | | | | |
|---|---|---|---|---|
| 2012/0110967 | A1 * | 5/2012 | Hinds | A01D 45/10 56/53 |
| 2018/0177130 | A1 * | 6/2018 | Almeida | A01D 45/10 |

FOREIGN PATENT DOCUMENTS

| | | | |
|---|---|---|---|
| CN | 112293060 | A | 2/2021 |
| CN | 113575114 | A | 11/2021 |
| CN | 114071989 | A | 2/2022 |
| CN | 114158348 | A | 3/2022 |
| WO | WO2022016249 | A1 | 1/2022 |

* cited by examiner

AGRICULTURAL HARVESTER AND RELATED AGRICULTURAL SYSTEM FOR ADJUSTING A FINNED ROLLER OF AN AGRICULTURAL HARVESTER

CROSS-REFERENCE TO RELATED APPLICATIONS

The present application is related and has right of priority to Brazilian Patent Application No. 10 2022 026687 5 filed on Dec. 27, 2022, the entirety of which is incorporated by reference for all purposes.

FIELD OF THE INVENTION

The present disclosure relates generally to agricultural harvesters and, more particularly, to agricultural harvesters and related agricultural systems for adjusting a finned roller of an agricultural harvester.

BACKGROUND OF THE INVENTION

Typically, agricultural harvesters include an assembly of processing equipment for processing harvested crop materials. For instance, a sugarcane harvester typically includes feed rollers configured to gather sugarcane stalks therebetween and direct the gathered sugarcane stalks toward a knock-down roller, which knocks the sugarcane stalks down toward a finned roller. The finned roller separates and further knocks the sugarcane stalks down toward a base cutter assembly which severs the sugarcane stalks. The severed sugarcane stalks are then conveyed via a feed roller assembly to a chopper assembly that cuts or chops the sugarcane stalks into pieces or billets (e.g., 6 inch cane sections). The processed crop material discharged from the chopper assembly is then directed as a stream of billets and debris into a primary extractor, within which the airborne debris (e.g., dust, dirt, leaves, etc.) is separated from the sugarcane billets. The separated/cleaned billets then fall into an elevator assembly for delivery to an external storage device.

The base cutter may be adjustable relative to a forward frame fixed to a chassis of the harvester such that a distance between the base cutter and the ground is adjustable to prevent ground losses. However, the finned roller is often coupled to the chassis. As such, the finned roller may become less aligned with the base cutter when the base cutter is moved, which may negatively affect the flow of sugarcane stalks from the finned roller through the base cutter assembly and cause crop losses.

Accordingly, an agricultural harvester and a related agricultural system for adjusting a finned roller of the agricultural harvester would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an agricultural harvester. The agricultural harvester may include a chassis, a forward frame fixed to the chassis, and a lateral support bar movably coupled to the forward frame, with the lateral support bar being at least partially positioned within the forward frame. The agricultural harvester may further include a base cutter coupled to the lateral support bar, and a finned roller coupled to the lateral support bar such that movement of the lateral support bar moves the base cutter and the finned roller together.

In another aspect, the present subject matter is directed to a system for adjusting a finned roller of an agricultural harvester. The system may have a chassis, a forward frame fixed to the chassis, and a lateral support bar movably coupled to the forward frame, with the lateral support bar being at least partially positioned within the forward frame. The system may further have a base cutter coupled to the lateral support bar and a finned roller coupled to the lateral support bar such that movement of the lateral support bar moves the base cutter and the finned roller together. Additionally, the system may have an actuator configured to selectively move the lateral support bar relative to the forward frame to adjust a position of the base cutter and the finned roller.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
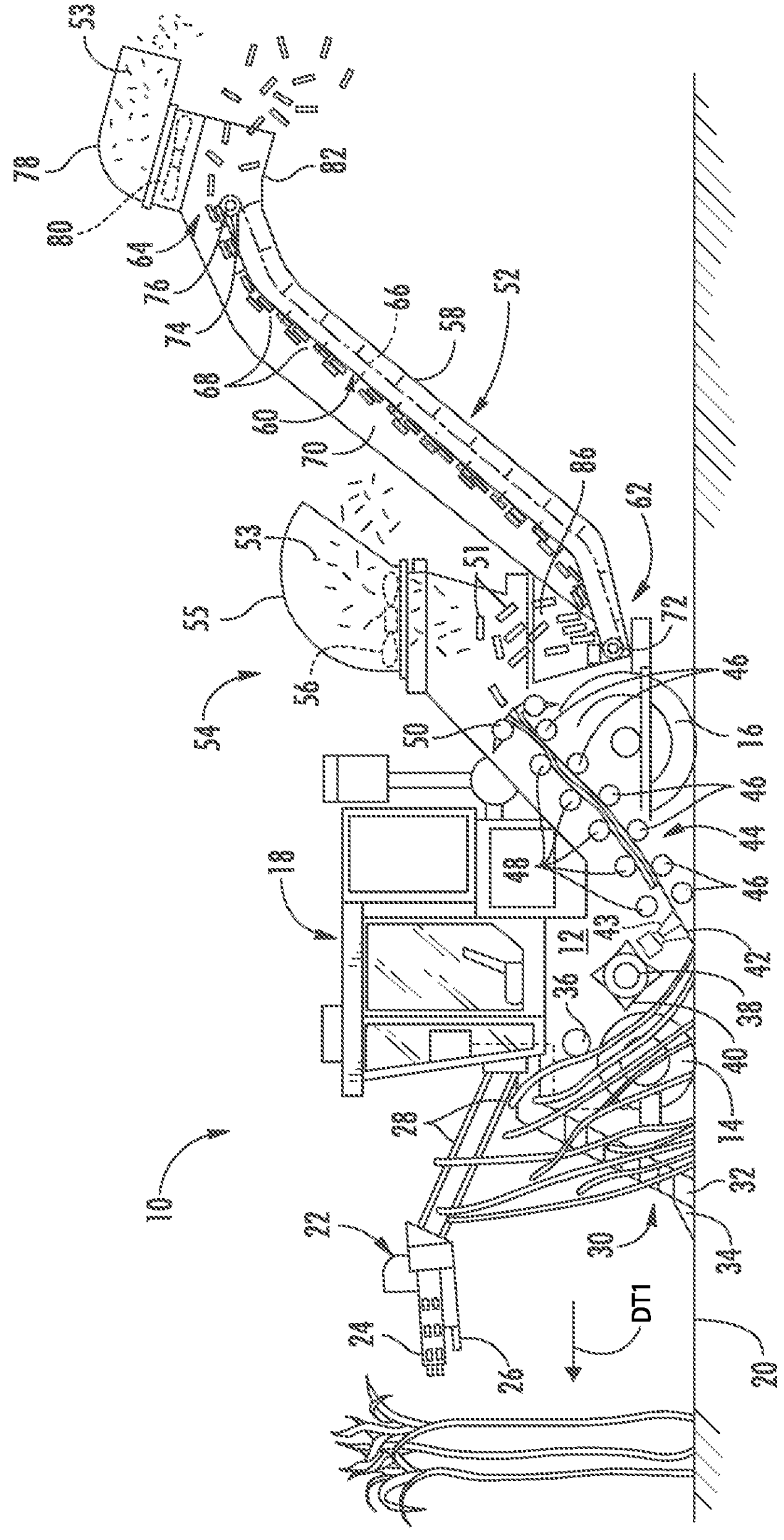
FIG. 1 illustrates a side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an agricultural harvester and a related agricultural system for adjusting a finned roller of a harvester, such as of a sugarcane harvester. More particularly, the harvester may include a chassis and a forward frame (sometimes referred to as a base cutter frame) fixed to the chassis. The harvester may further include one or more base cutters movably coupled by a lateral support bar to the forward frame. In accordance with aspects of the present subject matter, the harvester further includes a finned roller also movably coupled by the lateral support bar to the forward frame, such that the finned roller is configured to move together with the lateral support bar frame and the base cutters relative to the forward frame. Accordingly, the finned roller may be kept in alignment with the base cutters when the base cutter height is adjusted, such that the flow of severed sugarcane stalks from the finned roller to the base cutters is more smooth and fewer crop losses occur.

Referring now to the drawings, FIG. 1 illustrates a side view of one embodiment of an agricultural harvester 10 in accordance with aspects of the present subject matter. As shown, the harvester 10 is configured as a sugarcane harvester. However, in other embodiments, the harvester 10 may correspond to any other suitable agricultural harvester known in the art.

As shown in FIG. 1, the harvester 10 includes a frame or chassis 12, a pair of front wheels 14, a pair of rear wheels 16, and an operator's cab 18. The harvester 10 may also include a primary source of power (e.g., an engine mounted on the chassis 12) which powers one or both pairs of the wheels 14, 16 via a transmission (not shown). Alternatively, the harvester 10 may be a track-driven harvester and, thus, may include tracks driven by the engine as opposed to the illustrated wheels 14, 16. The engine may also drive a hydraulic fluid pump (not shown) configured to generate pressurized hydraulic fluid for powering various hydraulic components of the harvester 10.

The harvester 10 may include various components for cutting, processing, cleaning, and discharging sugarcane as the cane is harvested from an agricultural field 20. For instance, during operation, the harvester 10 is traversed across an agricultural field 20 for harvesting crop, such as sugarcane. The harvester 10 may include a topper assembly 22 positioned at its front end to intercept sugarcane as the harvester 10 is moved in the forward direction. As shown, the topper assembly 22 may include both a gathering disk 24 and a cutting disk 26. The gathering disk 24 may be configured to gather the sugarcane stalks so that the cutting disk 26 may be used to cut off the top of each stalk. As is generally understood, the height of the topper assembly 22 may be adjustable via a pair of arms 28 hydraulically raised and lowered, as desired, by the operator. After the height of the topper assembly 22 is adjusted via the arms 28, the gathering disk 24 on the topper assembly 22 may function to gather the sugarcane stalks as the harvester 10 proceeds across the field 20, while the cutter disk 26 severs the leafy tops of the sugarcane stalks for disposal along either side of harvester 10.

The harvester 10 may further include a crop divider 30 that extends upwardly and rearwardly from the field 20. In general, the crop divider 30 may include two spiral feed rollers 32. Each feed roller 32 may include a ground shoe 34 at its lower end to assist the crop divider 30 in gathering the sugarcane stalks for harvesting. As the stalks enter the crop divider 30, the ground shoes 34 may set the operating width to determine the quantity of sugarcane entering the throat of the harvester 10. The spiral feed rollers 32 then gather the stalks into the throat to allow a knock-down roller 36 to bend the stalks downwardly in conjunction with the action of a finned roller 38. The knock-down roller 36 is positioned near the front wheels 14 and the finned roller 38 positioned behind or downstream of the knock-down roller 36. As the knock-down roller 36 is rotated, the sugarcane stalks being harvested are knocked down. The finned roller 38 may include a plurality of intermittently mounted fins 40 that assist in forcing the sugarcane stalks downwardly. For instance, as the finned roller 38 is rotated, the sugarcane stalks that have been knocked down by the knock-down roller 36 are separated and further knocked down by the finned roller 38 as the harvester 10 continues to be moved in the forward direction relative to the field 20.

Once the stalks are angled downwardly as shown in FIG. 1, a base cutter 42 may then sever the base of the stalks from field 20. The base cutter 42 is positioned behind or downstream of the finned roller 38. As is generally understood, the base cutter 42 may include knives or blades 43 for severing the sugarcane stalks as the cane is being harvested. The blades 43, located on the periphery of the base cutter 42, may be rotated by a hydraulic motor (not shown) powered by the vehicle's hydraulic system. Moreover, in several embodiments, the blades may be angled downwardly to sever the base of the sugarcane as the cane is knocked down by the finned roller 38. Additionally, the height of the base cutter 42 (e.g., of the blades 43) above the field 20 may be adjustable. For instance, as will be described below in greater detail, it is preferable to sever the sugarcane stalks at or below a particular cutting height above the field 20 such that the maximum amount of sugarcane is harvested during the current harvesting operation and such that the remaining ratoons may regrow during the next growing season. As such, the vertical height of the base cutter 42 may be adjustable to maintain the cutting height for harvesting the sugarcane at or below the particular cutting height.

The severed stalks are then, by movement of the harvester 10, directed to a feed roller assembly 44 located downstream of the base cutter 42 for moving the severed stalks of sugarcane from base cutter 42 along the processing path. As shown in FIG. 1, the feed roller assembly 44 may include a plurality of bottom rollers 46 and a plurality of opposed, top pinch rollers 48. The harvested sugarcane may be pinched between various bottom and top rollers 46, 48 to make the sugarcane stalks more uniform and to convey the harvested sugarcane rearwardly (downstream) during transport. As the sugarcane is transported through the feed roller assembly 44, debris (e.g., rocks, dirt, and/or the like) may be allowed to fall through bottom rollers 46 onto the field 20.

At the downstream end of the feed roller assembly 44 (e.g., adjacent to the rearward-most bottom and top rollers 46, 48), a chopper assembly 50 may cut or chop the compressed sugarcane stalks. In general, the chopper assembly 50 may be used to cut the sugarcane stalks into pieces or "billets" 51, which may be, for example, six (6) inches long. The billets 51 may then be propelled towards an elevator assembly 52 of the harvester 10 for delivery to an external receiver or storage device (not shown).

As is generally understood, a primary extractor assembly 54 may be provided to help separate pieces of debris 53 (e.g., dust, dirt, leaves, etc.) from the sugarcane billets 51 before the billets 51 are received by the elevator assembly 52. The primary extractor assembly 54 is located immediately behind or downstream of the chopper assembly 50 relative to the flow of harvested crop and is oriented to direct the debris 53 outwardly from the harvester 10. The primary extractor assembly 54 may include an extractor fan 56 mounted within a housing 55 for generating a suction force or vacuum sufficient to separate and force the debris 53 through an inlet of the housing 55 into the primary extractor assembly 54 and out of the harvester 10 via an outlet of the housing 55. The separated or cleaned billets 51 are heavier than the debris 53 being expelled through the extractor 54, so the billets 51 may fall downward to the elevator assembly 52 instead of being pulled through the primary extractor assembly 54.

As further shown in FIG. 1, the elevator assembly 52 may include an elevator housing 58 and an elevator 60 extending within the elevator housing 58 between a lower, proximal end 62 and an upper, distal end 64. In general, the elevator 60 may include a looped chain 66 and a plurality of flights or paddles 68 attached to and evenly spaced on the chain 66. The paddles 68 may be configured to hold the sugarcane billets 51 on the elevator 60 as the billets are elevated along a top span of the elevator 70 defined between its proximal and distal ends 62, 64. Additionally, the elevator 60 may include lower and upper sprockets 72, 74 positioned at its proximal and distal ends 62, 64, respectively. As shown in FIG. 1, an elevator motor 76 may be coupled to one of the sprockets (e.g., the upper sprocket 74) for driving the chain 66, thereby allowing the chain 66 and the paddles 68 to travel in an endless loop between the proximal and distal ends 62, 64 of the elevator 60.

Additionally, in some embodiments, pieces of debris or trash 53 (e.g., dust, dirt, leaves, etc.) separated from the elevated sugarcane billets 51 may be expelled from the harvester 10 through a secondary extractor assembly 78 coupled to the rear end of the elevator housing 58. For example, the debris 53 expelled by the secondary extractor assembly 78 may be debris remaining after the billets 51 are cleaned and debris 53 expelled by the primary extractor assembly 54. As shown in FIG. 1, the secondary extractor assembly 78 may be located adjacent to the distal end 64 of the elevator 60 and may be oriented to direct the debris 53 outwardly from the harvester 10. Additionally, an extractor fan 80 may be mounted at the base of the secondary extractor assembly 78 for generating a suction force or vacuum sufficient to pick up the debris 53 and force the debris 53 through the secondary extractor assembly 78. The separated, cleaned billets 51, heavier than the debris 53 expelled through the extractor 78, may then fall from the distal end 64 of the elevator 60. Typically, the billets 51 may fall downwardly through an elevator discharge opening 82 of the elevator assembly 52 into an external storage device (not shown), such as a sugarcane billet cart.

Figure 2:
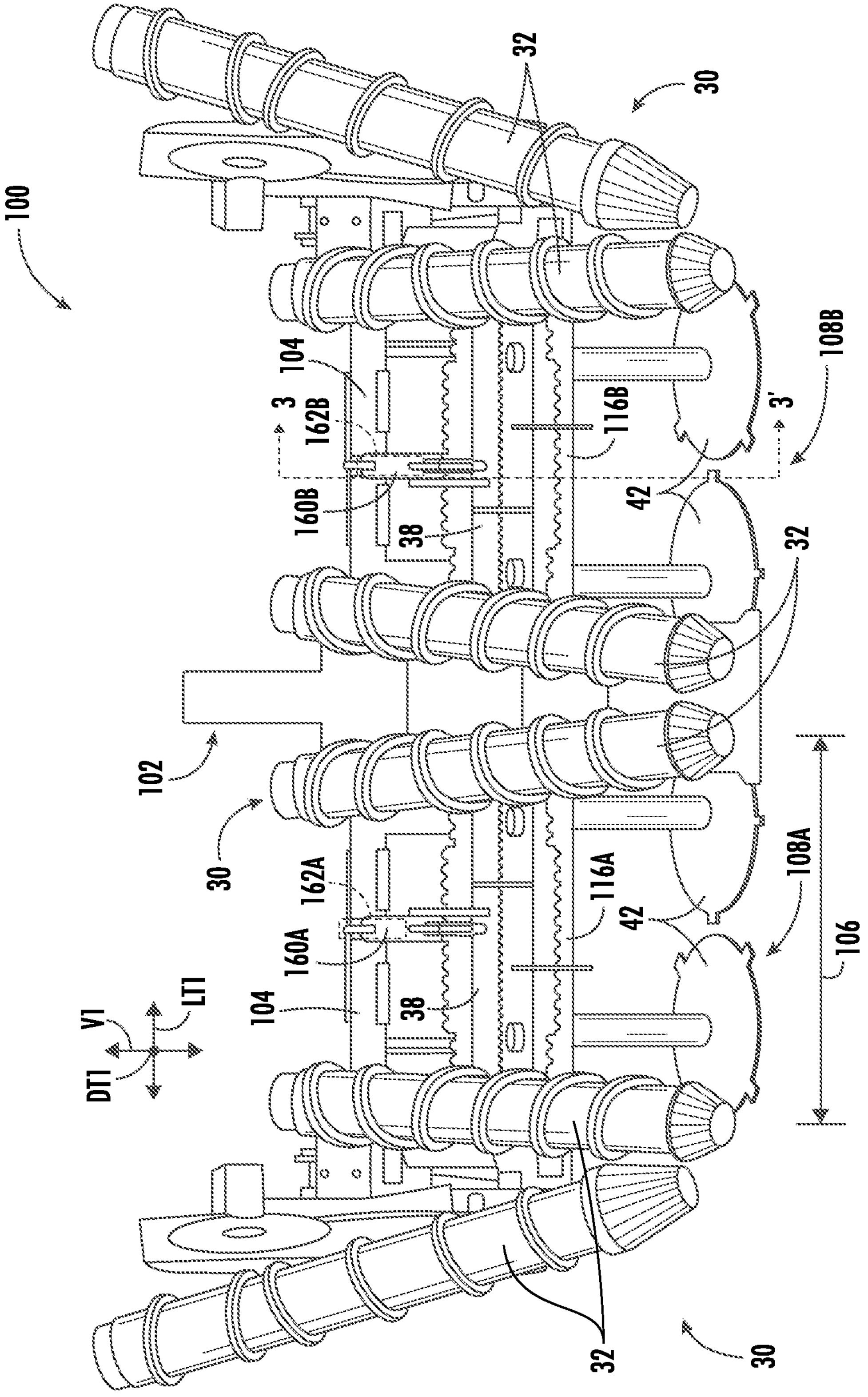
FIG. 2 illustrates a front view of a front end of an agricultural harvester in accordance with aspects of the present subject matter.
Figure 3:
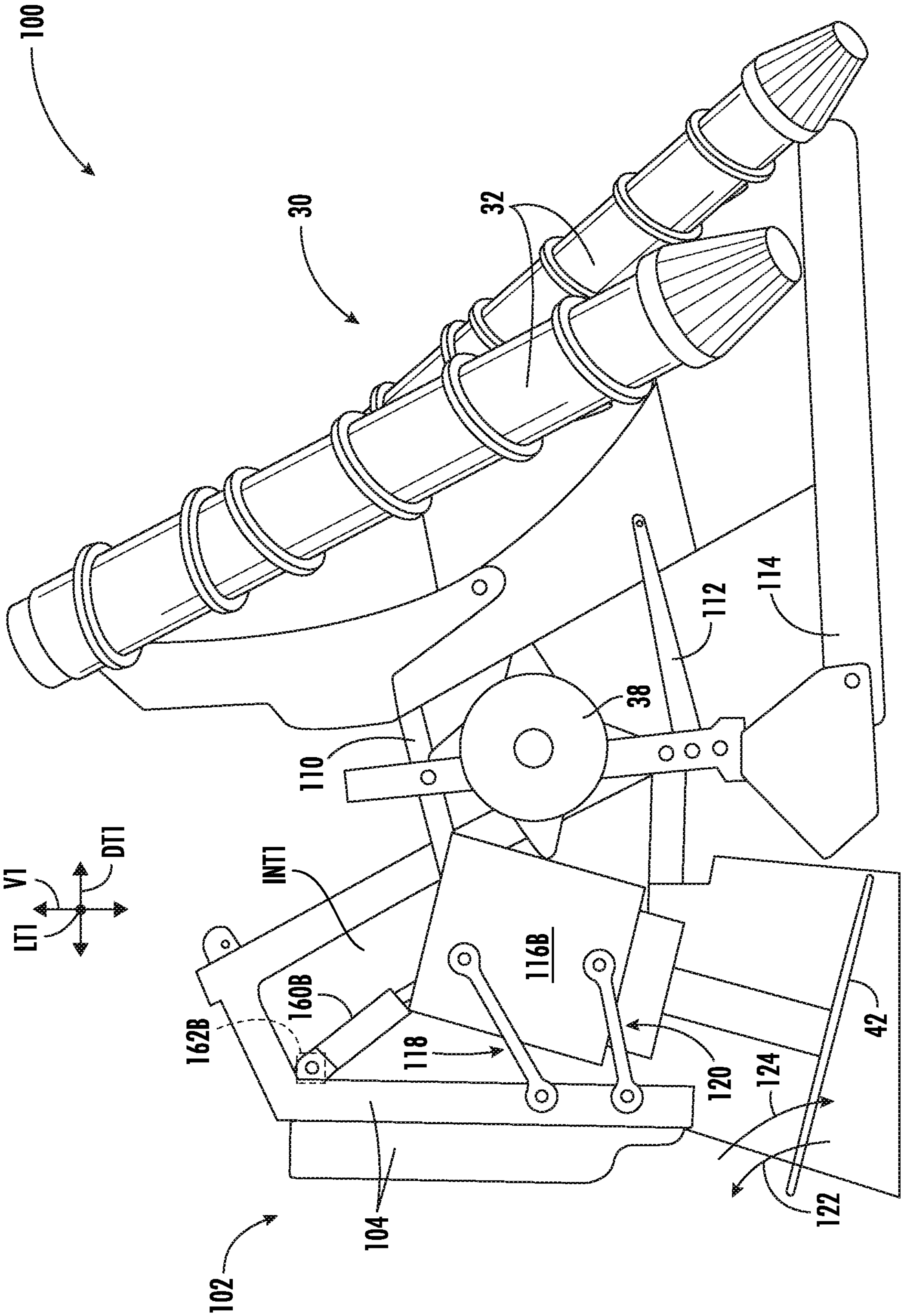
FIG. 3 illustrates a section view of the front end of the agricultural harvester shown in FIG. 2, taken with respect to section line 3-3', in accordance with aspects of the present subject matter.

Referring now to FIGS. 2 and 3, various views of a front end 100 suitable for use with a harvester, such as the harvester 10, are illustrated in accordance with aspects of the present subject matter. Particularly, FIG. 2 illustrates a front view of the front end 100 of the harvester 10, with the finned rollers 38 being shown transparently and with the blades 43 of the base cutters 42 being removed for example purposes. Additionally, FIG. 3 illustrates a section view of the front end 100 of the harvester 10, taken with respect to section line 3-3' in FIG. 2, with the blades 43 of the base cutters 42 being removed for example purposes.

As particularly shown in FIGS. 2 and 3, the front end 100 includes a forward frame 102 including a frame member 104, where the frame member 104 may be supported on the chassis 12 (FIG. 1) of the harvester 10. The frame member 104 is fixed relative to the chassis 12 (FIG. 1) of the harvester 10, such that the forward frame 102 is fixed relative to the chassis 12. The frame member 104 may generally support the various components of the harvester 10 relative to the chassis 12 (FIG. 1). For instance, each of the crop dividers 30 may be movably coupled at the forward end of the frame member 104 relative to the direction of travel DT1. For example, each of the crop dividers 30 may be supported by a respective linkage assembly including a first link 110 and a second link 112 relative to the frame member 104, as shown in FIG. 3. As such, the crop dividers 30 may move up and down in a vertical direction V1 relative to the frame member 104, independently of each other, as a shoe member 114 of each divider 30 moves along the surface of the field. Further, as shown in FIG. 2, adjacent crop dividers 30 are spaced apart along a lateral direction LT1 of the harvester 10 by a distance 106 to define lateral flow regions through which crop is directed towards the base cutters 42. For example, as shown in FIG. 2, a first lateral flow region 108A is defined between the left and center crop dividers 30 and a second lateral flow region 108B is defined between the center and right crop dividers 30. It should be appreciated that, while the front end 100 is shown as including three crop dividers 30, the front end 100 may include any other suitable number of crop dividers 30, such as two, four, or more crop dividers 30, such that one, three, or more flow regions are instead defined by the crop dividers 30. Similarly, it should be appreciated that, while each crop divider 30 is shown as having two spiral rollers 32, any other suitable number of spiral rollers 32 for each crop divider 30 may instead be provided, such as one, three, or more spiral rollers 32 per crop divider 30.

The finned rollers 38 and the base cutters 42 may also be supported relative to the frame member 104, within the flow regions 108A, 108B, with the finned rollers 38 being generally positioned forward of the base cutters 42 relative to the direction of travel DT1 and rearward of the dividers 30 relative to the direction of travel DT1. For instance, as shown in FIG. 2, the base cutters 42 in the first lateral flow region 108A are coupled to a first lateral support bar 116A and the base cutters 42 in the second lateral flow region 108B are coupled to a second lateral support bar 116B. Each of the lateral support bars 116A, 116B may be positioned within the frame 102 and movably coupled to the frame member 104, independently of each other. For example, each of the lateral support bars 116A, 116B is movably coupled to the frame member 104 by a respective linkage assembly including a first link 118 and a second link 120, as shown in FIG. 3. As such, the lateral support bars 116A, 116B (and the corresponding base cutters 42) are movable in a first direction 122 relative to the frame member 104, further from the surface of the field in the vertical direction V1, and in a second, opposite direction 124 relative to the frame member 104, closer to the surface of the field in the vertical direction V1. In some instances, the lateral support bars 116A, 116B are positioned at least partially within an interior space INTI defined by the frame 102. In one instance, the lateral support bars 116A, 116B are positioned completely within the interior space INTI defined by the frame 102.

As shown in FIG. 2, a first actuator 160A is coupled between the frame member 104 and the first lateral support bar 116A to selectively move the first lateral support bar 116A relative to the frame member 104. Similarly, a second actuator 160B is coupled between the frame member 104 and the second lateral support bar 116B to selectively move the second lateral support bar 116B relative to the frame member 104, independently of actuation of the first lateral support bar 116A by the first actuator 160A. In the illustrated embodiments, the actuators 160A, 160B are linear actuators (e.g., electric linear actuators, hydraulic linear actuators, and/or the like). However, it should be appreciated that, in other embodiments, the actuators 160A, 160B may instead be rotary actuators. It should additionally be appreciated that, because the frame 102 is fixed to the chassis 12, the actuators 160A, 160B may be less robust than if the frame 102 was not fixed to the chassis 12.

In some instances, each of the actuators 160A, 160B is configured as an electro-hydraulic feedback actuator, having one or more feedback sensors 162A, 162B integrated therein, with the feedback sensor(s) 162A, 162B being configured to generate data indicative of movement of the actuators 160A, 160B, which is, in turn, indicative of the positions of the base cutters 42 relative to the surface of the field. However, it should be appreciated that, in some embodiments, the feedback sensor(s) 162A, 162B may instead, or additionally, be provided separate of the actuators 160A, 160B, such that the feedback sensor(s) 162A, 162B generate data indicative of movement of the lateral support bars 116A, 116B, which is, in turn, indicative of the positions of the base cutters 42 relative to the surface of the field. The feedback sensor(s) 162A, 162B may be any suitable type of position sensor, such as a linear position sensor (e.g., linear transducers, and/or the like) or an angular position sensor (e.g., a rotary potentiometer, rotary encoder, and/or the like). The feedback sensor(s) 162A, 162B may additionally, or alternatively, be configured to generate data indicative of the force applied on the lateral support bars 116A, 166B by the base cutters 42.

It is important to maintain the base cutters 42 at a desired position or height relative to the surface of the field in the vertical direction V1 throughout a harvesting operation. For instance, when the base cutters 42 are too high relative to the surface of the field, some of the harvestable stalk is left behind, which reduces the overall yield for the harvesting operation. When the base cutters 42 are too low relative to the field, the base cutters 42 may cause the stalk to at least partially uproot and/or otherwise damage the ratoon for future growth. However, the surface of the field may vary significantly across the lateral width of the harvester 10 in the lateral direction LT1. As such, in some embodiments, the actuators 160A, 160B may be automatically controlled via any suitable method to adjust the position of the base cutters 42. For instance, the actuator(s) 160A, 160B may be controlled based at least in part on the data generated by the feedback sensor(s) 162A, 162B indicative of the position of the base cutters 42 relative to the frame member 104 and/or indicative of the force applied on the lateral support bars 116A, 116B by the base cutters 42 to keep the base cutters 42 at a proper height relative to the surface of the field. However, in some embodiments, the actuators 160A, 160B may be alternatively, or additionally, controlled manually.

Figure 4A:
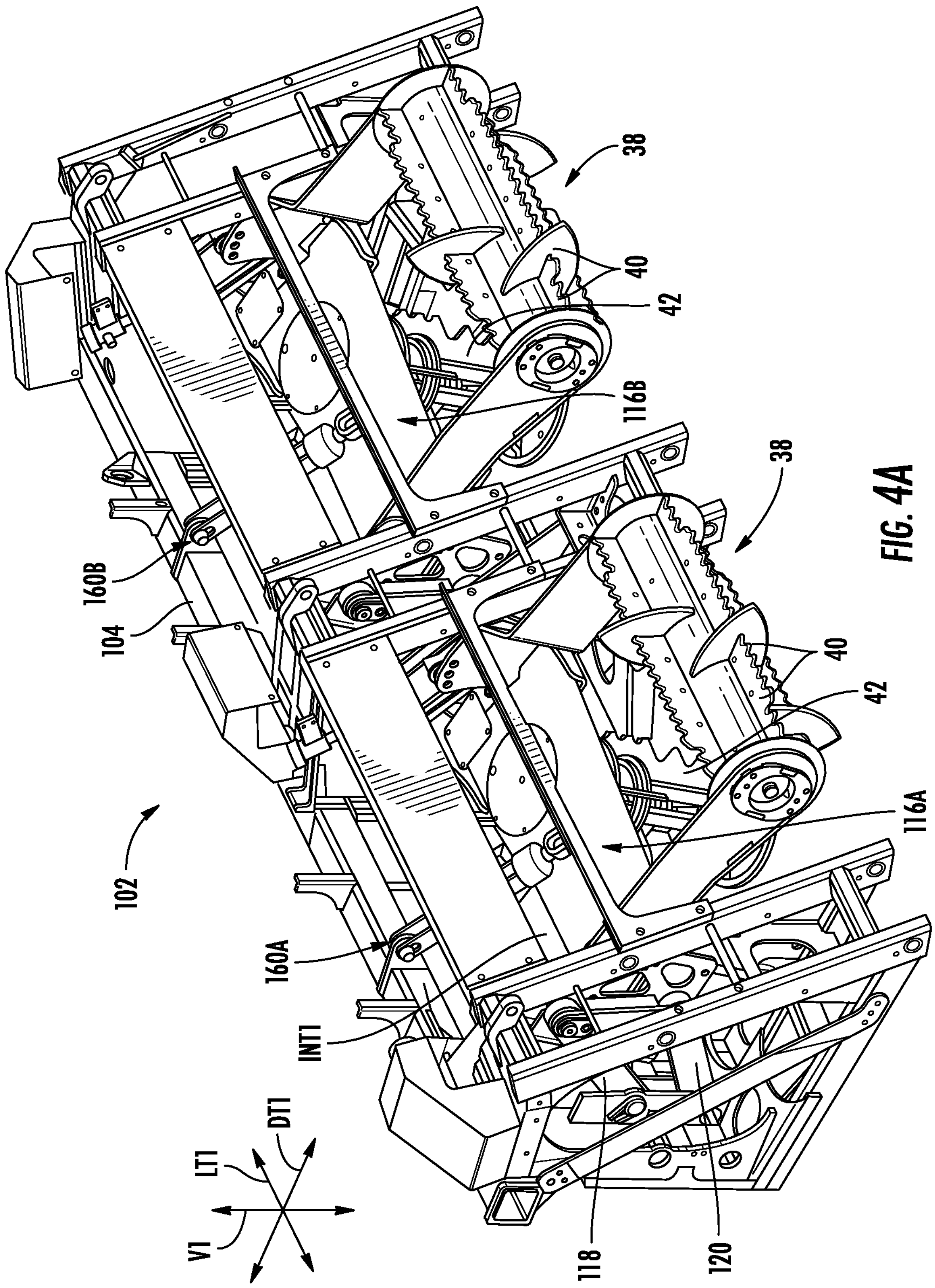
FIGS. 4A and 4B illustrate perspective views of part of the front end of the agricultural harvester shown in FIG. 2 in accordance with aspects of the present subject matter, particularly illustrating a finned roller of the front end of the harvester.

It is also important that the finned rollers 38 are properly aligned with the base cutters 42, so that the finned rollers 38 smoothly direct the gathered crop towards the base cutters 42 to be severed, with minimal crop losses. Thus, referring now to FIGS. 4A and 4B, different perspective views of part of the front end of the harvester 10 are shown, particularly illustrating at least one of the finned rollers 38. As particularly shown in FIG. 4A, each of the lateral support bars 116A, 116B are movably coupled to the frame member 104 by respective pairs of the links 118, 120 (only one pair of which is visible) and by the respective actuator 160A, 160B. The lateral support bars 116A, 116B are adjustably positioned at least partially within the interior space(s) INTI defined by the frame 102. In some instances, as indicated above, the lateral support bars 116A, 116B are positioned completely within the interior space(s) INTI defined by the frame 102. The finned rollers 38 are positioned forward of the lateral support bars 116A, 116B relative to the direction of travel DT1. In some instances, the finned rollers 38 are positioned at least partially outside (e.g., forward) of the frame 102. In one instance, the finned rollers 38 are positioned completely outside (e.g., forward) of the frame 102.

Figure 4B:
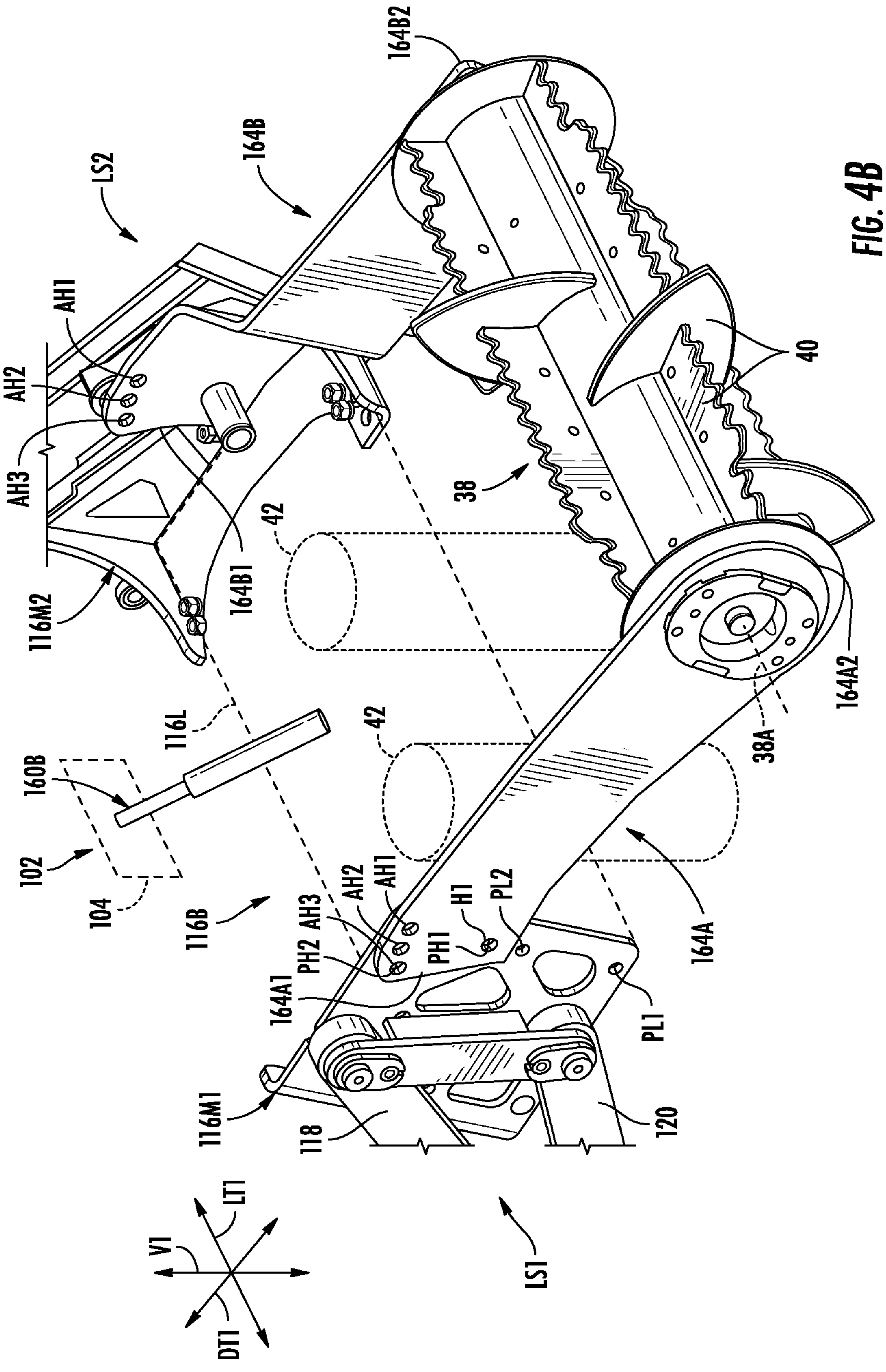

In accordance with aspects of the present subject matter, each of the finned rollers 38 is coupled to move with the associated base cutter(s) 42 relative to the frame member 104 of the frame 102 fixed to the chassis 12 (not shown) as the respective actuator 160A, 160B extends and retracts. For instance, FIG. 4B illustrates the finned roller 38 associated with the second lateral support bar 116B in more detail. As shown in FIG. 4B, the second lateral support bar 116B extends between a first lateral side LS1 and a second lateral side LS2 along the lateral direction LT1. In some embodiments, the second lateral support bar 116B has a lateral support portion 116L (shown transparently), a first mounting bracket 116M1, and a second mounting bracket 116M2. The associated base cutters 42 (shown transparently) are configured to be rotatably supported (e.g., coupled) to the lateral support portion 116L such that the base cutters 42 are spaced apart along the lateral direction LT1 and extend downwardly from the lateral support portion 116L along the vertical direction V1. The lateral support portion 116L is coupled to the first mounting bracket 116M1 proximate the first lateral side LS1 of the lateral support bar 116B and is coupled to the second mounting bracket 116M2 proximate the opposite, second lateral side LS2 of the lateral support bar 116B. The mounting brackets 116M1, 116M2, in turn, are movably coupled to the frame member 104 by the links 118, 120 (one pair of which is visible).

In some embodiments, the finned roller 38 is coupled to the lateral support bar 116B by a first support arm 164A and a second support arm 164B such that the finned roller 38 extends forward of the base cutters 42 relative to the direction of travel DT1. More particularly, the first support arm 164A extends between a first end 164A1 and a second end 164A2, with the first end 164A1 of the first support arm 164A being coupled to the lateral support bar 116B, and with the second end 164A2 of the first support arm 164A being rotatably coupled to one lateral end of the finned roller 38. Similarly, the second support arm 164B extends between a first end 164B1 and a second end 164B2, with the first end 164B1 of the second support arm 164B being coupled to the lateral support bar 116B, and with the second end 164B2 of the second support arm 164B being rotatably coupled to the other lateral end of the finned roller 38. In some embodiments, the first ends 164A1, 164B1 of the support arms 164A, 164B are coupleable to the lateral support bar 116B such that the support arms 164A, 164B are rotatably fixed (not rotatable or pivotable) relative to the support bar 116B. In such embodiments, an axis of rotation 38A of the finned roller 38 is fixed relative to the lateral support bar 116B and the base cutters 42. Further, movement of the lateral support bar 116B causes the base cutters 42 and the finned roller 38 to move together, as one unit.

In one embodiment, the support arms 164A, 164B may be fixable to the support bar 116B at different positions so that the positioning of the finned roller 38 relative to the base cutters 42 may be changed. For instance, in some embodiments, the first end 164A1 of the first support arm 164A is coupled to the first mounting bracket 116M1 and the first end 164B1 of the second support arm 164B is coupled to the second mounting bracket 116M2. For example, the first end 164A1, 164B1 of each of the support arms 164A, 164B may have a first hole H1 and a set of additional holes (e.g., a first additional hole AH1, a second additional hole AH2, a third additional hole AH3, etc.). The distance between the first hole H1 and each of the additional holes AH1, AH2, AH3 is the same. Similarly, each mounting bracket 116M1, 116M2 may have at least one set of openings, each set of openings including a first opening and a second opening (e.g., a first set of openings having first opening PL1 and a second opening PL2, and a second set of openings having first opening PH1 and second opening PH2). Generally, the distance between the openings of each set is the same as the distance between the first hole H1 and each of the additional holes AH1, AH2, AH3. In some embodiments, the sets of openings are spaced apart in at least one of the vertical direction V1 or the direction of travel DT1. For example, the first and second sets of openings are spaced apart along the vertical direction V1.

To couple the finned roller 38 to the lateral support bar 116B, a first connection element, such as a first pin, a screw, a rivet, and/or the like, may be removably inserted through the first hole H1 in each of the support arms 164A, 164B and through the first opening PL1, PH1 in each of the mounting brackets 116M1, 116M2. Additionally, a second connection element, similar to the first connection element, may be removably inserted through one of the set of additional holes (e.g., the first additional hole AH1, the second additional hole AH2, the third additional hole AH3, etc.) in each of the support arms 164A, 164B and through the second opening PL2, PH2 in each of the mounting brackets 116M1, 116M2. For example, in FIG. 4B, the first hole H1 in each of the support arms 164A, 164B is aligned with the first opening PH1 in each of the mounting brackets 116M1, 116M2, and the first additional hole AH1 in each of the support arms 164A, 164B is aligned with the second opening PH2 in each of the mounting brackets 116M1, 116M2.

Each of the additional holes AH1, AH2, AH3 in the support arms 164A, 164B may be associated with coupling the support arms 164A, 164B to the support bar 116B at a different angle, with each angle being associated with a different distance between the finned roller 38 and the base cutters 42 in the direction of travel DT1 and/or the vertical direction V1. For instance, the first additional hole AH1 positions the finned roller 38 higher in the vertical direction V1 and further forward in the direction of travel DT1 relative to the base cutters 42 than the second additional hole AH2, and the third hole positions the finned roller 38 higher in the vertical direction V1 and further forward in the direction of travel DT1 relative to the base cutters 42 than the third additional hole AH3. Similarly, each set of openings (e.g., the first set of openings PL1, PL2 and the second set of openings PH1, PH2) in the mounting brackets 116M1, 116M2 is associated with coupling the support arms 164A, 164B to the lateral support bar 116B at different height in the vertical direction V1 and/or at a different position along the direction of travel DT1. For instance, the first set of openings PL1, PL2 positions the finned roller 38 lower relative to the base cutters 42 than the second set of openings PH1, PH2.

It should be appreciated that, in some embodiments, each of the mounting brackets 116M1, 116M2 may include a set of second openings, similar to the sets of additional holes AH1, AH2, AH3 in the support arms 164A, 164B. Further, in some embodiments, each support arm 164A, 164B may only include one of the additional holes AH1, AH2, AH3 instead of the whole set of additional holes AH1, AH2, AH3. Similarly, in some embodiments, each support arm 164A, 164B may include a slot instead of the additional holes AH1, AH2, AH3.

Moreover, it should be appreciated that, in one embodiment, the finned roller 38 may be coupled additionally, or alternatively, to the lateral support portion 116L of the lateral support bar 116B. Additionally, it should be appreciated that the finned roller 38 associated with the first lateral support bar 116A may be supported relative to the frame member 104 in substantially the same manner as described with reference to the finned roller 38 associated with the second lateral support bar 116B.

Figure 5:
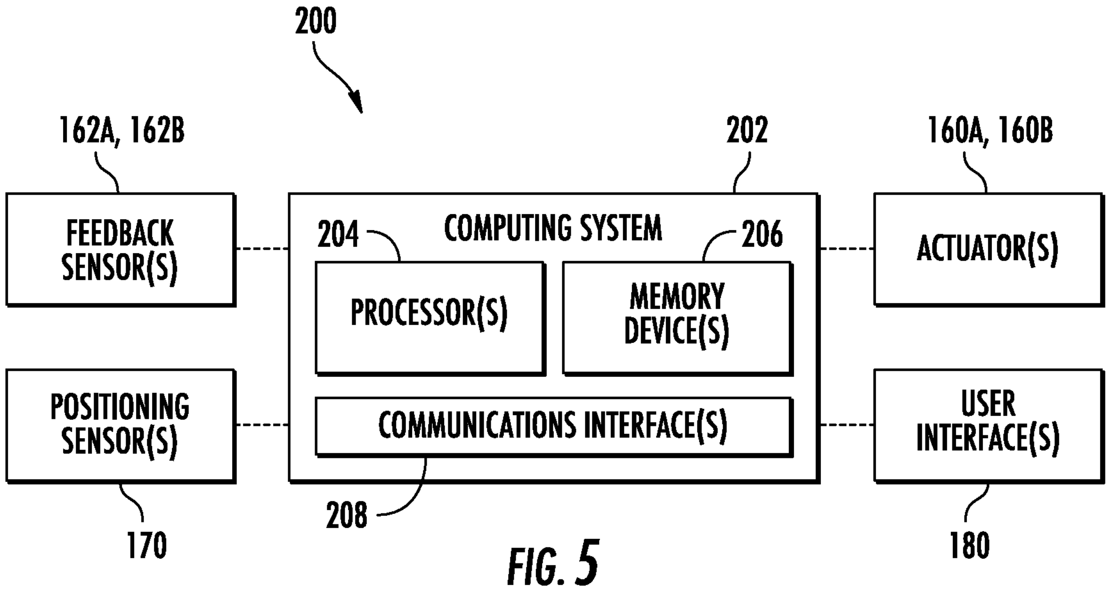
FIG. 5 illustrates a schematic view of a system for adjusting a finned roller of an agricultural harvester in accordance with aspects of the present subject matter.

Referring now to FIG. 5, a schematic view of a system 200 for adjusting the position of a finned roller of an agricultural harvester is illustrated in accordance with aspects of the present subject matter. In general, the system 200 will be described with reference to the agricultural harvester 10 described with reference to FIGS. 1-4B. However, it should be appreciated that the disclosed system 200 may be implemented with harvesters having any other suitable configurations.

In several embodiments, the system 200 may include one or more computing systems 202 and various other components configured to be communicatively coupled to and/or controlled by the computing system(s) 202, such as the actuator(s) 160A, 160B, the feedback sensor(s) 162A, 162B, and/or one or more user interface(s) 180. The user interface(s) 180 described herein may include, without limitation, any combination of input and/or output devices that allow an operator to provide inputs to the computing system 202 and/or that allow the computing system 202 to provide feedback to the operator, such as a keyboard, keypad, pointing device, buttons, knobs, touch sensitive screen, mobile device, audio input device, audio output device, and/or the like.

In general, the computing system(s) 202 may correspond to any suitable processor-based device(s), such as a computing device or any combination of computing devices. Thus, as shown in FIG. 5, the computing system(s) 202 may generally include one or more processor(s) 204 and associated memory devices 206 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 206 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 206 may generally be configured to store information accessible to the processor(s) 204, including data that can be retrieved, manipulated, created and/or stored by the processor(s) 204 and instructions that can be executed by the processor(s) 204.

In several embodiments, the computing system 202 may correspond to an existing computing system of the agricultural harvester 10. However, it should be appreciated that, in other embodiments, the computing system 202 may instead correspond to a separate processing device. For instance, in one embodiment, the computing system 202 may form all or part of a separate plug-in module that may be installed within the agricultural harvester 10 to allow for the disclosed system to be implemented without requiring additional software to be uploaded onto existing control devices of the agricultural harvester 10.

In some embodiments, the computing system 202 may include a communications module or interface 208 to allow for the computing system 202 to communicate with and/or electronically control any of the various system components described herein. For instance, one or more communicative links or interfaces (e.g., one or more data buses) may be provided between the communications interface 208 and the sensor(s) 162A, 162B, 170 to allow data to be transmitted from the sensor(s) harvester to the computing system 202. Similarly, one or more communicative links or interfaces (e.g., one or more data buses) may be provided between the communications interface 208 and the actuator(s) 160A, 160B to allow the computing system 202 to control the operation of one or more components of the actuator(s) 160A, 160B. Additionally, one or more communicative links or interfaces (e.g., one or more data buses) may be provided between the communications interface 208 and one or more user interfaces (e.g., the user interface(s) 180) to allow operator inputs to be received by the computing system 202 and/or the allow the computing system 202 to control the operation of one or more components of the user interface(s) 180.

The memory 206 may be configured for storing data received from the sensor(s) 162A, 162B. For instance, as discussed above, the sensor(s) 162A, 162B may be associated with the harvester 10 configured to perform a harvesting operation within the field 20. Particularly, the feedback sensor(s) 162A, 162B are configured to generate data indicative of the position of the associated base cutters 42 relative to the frame member 104 and/or the pressure applied by the base cutters 42 on the frame member 104, which, in turn is indicative of the position of the associated base cutters 42 and the finned rollers 38 relative to the surface of the field. The sensor(s) 162A, 162B may be configured to continuously or periodically capture data. The data generated by the sensor(s) 162A, 162B may be transmitted to the computing system(s) 202 and stored within the memory 206 for subsequent processing and/or analysis. It should be appreciated that, as used herein, the term "data" may include any suitable type of data received from the sensor(s) 162A, 162B that allows for the relative positionings of the base cutters 42 and associated finned rollers 38 relative to the frame member 104 and/or the ground, to be analyzed and/or estimated.

In some embodiments, the data from the sensor(s) 162A, 162B may be geo-referenced or may otherwise be stored with corresponding location data associated with the specific location at which such data was collected within the field. For instance, in one embodiment, the data from the sensor(s) 162A, 162B may be correlated to a corresponding position within the field based on location data received from the positioning sensor(s) 170, which may include a Global Positioning System (GPS) or another similar positioning device(s), configured to transmit a location corresponding to a position of the harvester 10 within the field when the data is collected by the sensor(s) 162A, 162B. As such, the contour of the surface of the field may be mapped based at least in part on the data collected by the sensor(s) 162A, 162B for subsequent field operations and/or analysis.

In one embodiment, the computing system 202 may be configured to control the operation of the actuator(s) 160A, 160B based at least in part on an input from an operator provided via the user interface(s) 180 to move the base cutter(s) 42 and associated finned roller(s) 38. For instance, the computing system 202 may receive an operator input via the user interface(s) 180 indicative of adjusting at least one of the lateral support bar(s) 116A, 116B, the base cutter(s) 42, or the finned roller(s) relative to the forward frame 102 and, in return, control the operation of the actuator(s) 160A, 160B to actuate the base cutter(s) 42 and associated finned roller(s) 38 according to the operator input.

However, it should be appreciated that the computing system 202 may be configured to control the operation of the actuator(s) 160A, 160B based at least in part on any other suitable input. For instance, the computing system 202 may be configured to receive a prescription map that correlates a position of the base cutter(s) 42 and associated finned roller(s) 38 relative to the frame 102 with each position within a field. In such embodiment, the computing system 202 may be configured to monitor the position of the base cutter(s) 42 and the associated finned roller(s) 38 relative to the frame 102 based at least in part on the data received from the feedback sensor(s) 162A, 162B and the position of the harvester 10 within the field based at least in part on the data received from the positioning sensor(s) 170 with respect to the desired position of the base cutter(s) 42 and associated finned roller(s) 38 relative to the frame 102 at the corresponding position within the field defined by the prescription map. In response to a difference between the monitored and desired positions of the base cutter(s) 42 and associated finned roller(s) 38 relative to the frame 102 for the location in the field, the computing system 202 may be configured to automatically control the operation of the actuator(s) 160A, 160B to account for such difference and/or to generate a notification to an operator of the harvester 10 indicating such difference via the user interface(s) 180 so that the operator may provide an input for controlling the actuator(s) 160A, 160B.

Additionally, or alternatively, the computing system 202 may be configured to monitor the force applied on the frame 102 by the base cutters 42 based on the data received from the feedback sensor(s) 162A, 162B with respect to a desired force or force range. The computing system 202 may be configured to automatically control the operation of the actuator(s) 160A, 160B to actuate the base cutter(s) 42 and associated finned roller(s) 38 in response to the force applied on the frame 102 by the base cutters 42 being different from the desired force or outside of the force range to bring the force applied on the frame 102 by the base cutters 42 back to the desired force or within the desired force range and/or to generate a notification to an operator of the harvester 10 indicating such difference via the user interface(s) 180 so that the operator may provide an input for controlling the actuator(s) 160A, 160B.

As such, the computing system 202 may be configured to adjust the position of the finned roller(s) 38 relative to the frame 102 and the chassis 12 by controlling the actuator(s) 160A, 160B while preserving or maintaining the same alignment of the finned roller(s) 38 relative to the base cutters 42.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An agricultural harvester, comprising:

a chassis;

a forward frame fixed to the chassis;

a lateral support bar movably coupled to the forward frame, the lateral support bar being at least partially positioned within the forward frame;

a base cutter coupled to the lateral support bar;

a finned roller;

a first support arm coupled to the lateral support bar; and a second support arm coupled to the lateral support bar, wherein the finned roller is coupled to the lateral support bar by the first support arm and the second support arm such that movement of the lateral support bar moves the base cutter and the finned roller together, and wherein the first support arm and the second support arm are couplable in a plurality of positions to the lateral support bar, wherein the plurality of positions correspond to different connection locations along each support arm such that the finned roller is positioned at a different respective position relative to the lateral support bar and the base cutter in each of the plurality of positions.

2. The agricultural harvester of claim 1, wherein the lateral support bar comprises a lateral support portion, a first mounting bracket, and a second mounting bracket, the base cutter being coupled to the lateral support bar by the lateral support portion, the first mounting bracket being coupled to the lateral support portion proximate a first lateral side of the lateral support portion, the second mounting bracket being coupled to the lateral support portion proximate a second lateral side of the lateral support portion, and the finned roller being coupled to the lateral support bar by the first and second mounting brackets.

3. The agricultural harvester of claim 2, wherein each of the first mounting bracket and the second mounting bracket is movably coupled to the forward frame by at least one link such that the lateral support bar is movably coupled to the forward frame.

4. The agricultural harvester of claim 2, wherein a first end of the first support arm is coupled to the first mounting bracket, and a second end of the first support arm is rotatably coupled to the finned roller; and wherein a first end of the second support arm is coupled to the second mounting bracket, and a second end of the second support arm is rotatably coupled to the finned roller.

5. The agricultural harvester of claim 4, wherein the first end of the first support arm is rotatably fixed to the first mounting bracket, and wherein the first end of the second support arm is rotatably fixed to the second mounting bracket.

6. The agricultural harvester of claim 4, wherein each of the first end of the first support arm and the first end of the second support arm define a first hole and a set of additional holes, each of the set of additional holes being spaced apart from the first hole by a first distance, wherein the lateral support bar includes a first opening and a second opening, the first and second openings being spaced apart by the first distance, the first opening being aligned with the first hole, each of the set of additional holes being associated with a respective position of the plurality of positions.

7. The agricultural harvester of claim 6, wherein the finned roller is at a first position relative to the base cutter when a first additional hole of the set of additional holes is aligned with the second opening and at a second position relative to the base cutter when a second additional hole of the set of additional holes is aligned with the second opening.

8. The agricultural harvester of claim 7, wherein the finned roller is lower relative to the base cutter when the finned roller is in the first position than when in the second position.

9. The agricultural harvester of claim 1, further comprising an actuator configured to selectively move the lateral support bar relative to the forward frame.

10. A system for adjusting a finned roller of an agricultural harvester, the system comprising:

a chassis;

a forward frame fixed to the chassis;

a lateral support bar movably coupled to the forward frame, the lateral support bar being at least partially positioned within the forward frame;

a base cutter coupled to the lateral support bar;

a first support arm coupled to the lateral support bar;

a second support arm coupled to the lateral support bar;

a finned roller coupled to the lateral support bar by the first support arm and the second support arm such that movement of the lateral support bar moves the base cutter and the finned roller together, the first support arm and the second support arm being couplable in a plurality of positions to the lateral support bar, wherein the plurality of positions correspond to different connection locations along each support arm such that the finned roller is positioned at a different respective position relative to the lateral support bar and the base cutter in each of the plurality of positions; and an actuator configured to selectively move the lateral support bar relative to the forward frame to adjust a position of the base cutter and the finned roller.

11. The system of claim 10, wherein the lateral support bar comprises a lateral support portion, a first mounting bracket, and a second mounting bracket, the base cutter being coupled to the lateral support bar by the lateral support portion, the first mounting bracket being coupled to the lateral support portion proximate a first lateral side of the lateral support portion, the second mounting bracket being coupled to the lateral support portion proximate a second lateral side of the lateral support portion, and the finned roller being coupled to the lateral support bar by the first and second mounting bracket.

12. The system of claim 11, wherein each of the first mounting bracket and the second mounting bracket is movably coupled to the forward frame by at least one link such that the lateral support bar is movably coupled to the forward frame.

13. The system of claim 11, wherein a first end of the first support arm is coupled to the first mounting bracket, and a second end of the first support arm is rotatably coupled to the finned roller; and wherein a first end of the second support arm is coupled to the second mounting bracket, and a second end of the second support arm is rotatably coupled to the finned roller.

14. The system of claim 13, wherein the first end of the first support arm is rotatably fixed to the first mounting bracket, and wherein the first end of the second support arm is rotatably fixed to the second mounting bracket.

15. The system of claim 13, wherein each of the first end of the first support arm and the first end of the second support arm define a first hole and a set of additional holes, each of the set of additional holes being spaced apart from the first hole by a first distance, wherein the lateral support bar includes a first opening and a second opening, the first and second openings being spaced apart by the first distance, the first opening being aligned with the first hole, and wherein the finned roller is at a first position relative to the base cutter when a first additional hole of the set of additional holes is aligned with the second opening and at a second position relative to the base cutter when a second additional hole of the set of additional holes is aligned with the second opening.

16. The system of claim 10, further comprising a computing system in communication with the actuator, the computing system being configured to control, with one or more computing devices, an operation of the actuator to adjust the position of the finned roller.

17. The system of claim 16, wherein the computing system is further configured to receive, with the one or more computing devices, an input indicative of adjusting a position of the finned roller, and wherein the computing system is configured to control the operation of the actuator to adjust the position of the finned roller in response to the input indicative of adjusting the position of the finned roller.

18. The system of claim 17, further comprising a user interface, wherein the computing system is configured to receive the input indicative of adjusting the position of the finned roller via the user interface.

19. The system of claim 10, wherein the lateral support bar is supported on the chassis by being movably coupled completely within the forward frame to the forward frame.

20. The system of claim 10, wherein the actuator is configured to selectively move the lateral support bar at least along a vertical direction relative to the forward frame to adjust the position of the base cutter and the finned roller.

* * * * *